United States Patent
Dunne et al.

(10) Patent No.: US 10,531,470 B2
(45) Date of Patent: *Jan. 7, 2020

(54) PEER-TO-PEER SHARING OF NETWORK RESOURCES

(71) Applicants: International Business Machines Corporation, Armonk, NY (US); University College Dublin, Belfield (IE)

(72) Inventors: Jonathan Dunne, Dungarvan (IE); Paul B. French, Cork (IE); James P. Galvin, Jr., Georgetown, KY (US); Yi Han, Blackrock (IE); Patrick J. O'Sullivan, Ballsbridge (IE)

(73) Assignees: INTERNATIONAL BUSINESS MACHINES CORPORATION, Armonk, NY (US); UNIVERSITY COLLEGE DUBLIN, BELFIELD, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/009,206

(22) Filed: Jun. 15, 2018

(65) Prior Publication Data

US 2018/0295613 A1    Oct. 11, 2018

Related U.S. Application Data

(63) Continuation of application No. 15/205,461, filed on Jul. 8, 2016, now Pat. No. 10,028,282, which is a (Continued)

(51) Int. Cl.
*H04W 72/00* (2009.01)
*H04W 72/04* (2009.01)
(Continued)

(52) U.S. Cl.
CPC ....... *H04W 72/048* (2013.01); *H04L 43/0876* (2013.01); *H04L 67/104* (2013.01);
(Continued)

(58) Field of Classification Search
CPC ..... H04W 8/245; H04W 24/00; H04W 28/04; H04W 76/005; H04W 72/048;
(Continued)

(56) References Cited

U.S. PATENT DOCUMENTS 6,687,224 B1    2/2004  Ater et al.
7,002,933 B1    2/2006  Poon et al.
(Continued)

FOREIGN PATENT DOCUMENTS

CN        102056245 A1     5/2011

OTHER PUBLICATIONS

"BeWifi," [online] Telefonica Research and Innovation © 2014 [retrieved Jul. 10, 2014] retrieved from the Internet: <http://tid.es/research/areas/bewifi>, 10 pg.
(Continued)

*Primary Examiner* — Danh C Le
(74) *Attorney, Agent, or Firm* — Cuenot, Forsythe & Kim, LLC (57) ABSTRACT

A role of sharing broker can be activated on a first mobile device, the role of sharing broker brokering sharing of network resources of at least a first network among a plurality of other mobile devices. Data usage by the first mobile device on at least the first network can be monitored. Responsive to the data usage by the first mobile device on at least the first network exceeding a threshold value, an amount of data usage on at least the first network being shared by the first mobile device among the plurality of other mobile devices can be adjusted.

20 Claims, 4 Drawing Sheets

Related U.S. Application Data continuation of application No. 14/948,984, filed on Nov. 23, 2015, now Pat. No. 9,451,650, which is a continuation of application No. 14/328,179, filed on Jul. 10, 2014, now Pat. No. 9,220,123.

(51) Int. Cl.
| | | |
|---|---|---|
| *H04L 29/08* | (2006.01) | |
| *H04W 76/14* | (2018.01) | |
| *H04W 16/14* | (2009.01) | |
| *H04W 24/08* | (2009.01) | |
| *H04W 72/06* | (2009.01) | |
| *H04L 12/26* | (2006.01) | |
| *H04W 92/18* | (2009.01) | |
| *H04W 4/08* | (2009.01) | |
| *H04W 84/18* | (2009.01) | |
| *H04W 88/04* | (2009.01) | |

(52) U.S. Cl.
CPC ........... *H04L 67/1074* (2013.01); *H04W 4/08* (2013.01); *H04W 16/14* (2013.01); *H04W 24/08* (2013.01); *H04W 72/06* (2013.01); *H04W 76/14* (2018.02); *H04W 92/18* (2013.01); *H04W 84/18* (2013.01); *H04W 88/04* (2013.01)

(58) Field of Classification Search
CPC ..... H04W 16/14; H04W 76/023; H04W 4/08; H04W 84/18; H02J 7/0055; H04L 1/1854
USPC .......................... 455/452.1, 418, 550.1, 518
See application file for complete search history.

(56) References Cited

U.S. PATENT DOCUMENTS

| | | | |
|---|---|---|---|
| 8,054,826 B2 | 11/2011 | Cheng et al. | |
| 8,250,535 B2 | 8/2012 | Groves et al. | |
| 8,478,849 B2 | 7/2013 | Marl et al. | |
| 8,520,535 B2 | 8/2013 | Dawson et al. | |
| 8,761,734 B2 | 6/2014 | Sandegard et al. | |
| 9,071,967 B1 | 6/2015 | Davies et al. | |
| 9,219,825 B2* | 12/2015 | Sheikh Naziruddin | H04M 15/7652 |
| 9,220,123 B1 | 12/2015 | Dunne et al. | |
| 9,313,816 B2 | 4/2016 | Dunne et al. | |
| 9,451,650 B2 | 9/2016 | Dunne et al. | |
| 9,699,592 B2* | 7/2017 | El Khayat | H04L 67/18 |
| 9,942,903 B2 | 4/2018 | Dunne et al. | |
| 10,028,282 B2 | 7/2018 | Dunne et al. | |
| 2007/0025264 A1 | 2/2007 | Cheng et al. | |
| 2008/0043634 A1 | 2/2008 | Wang et al. | |
| 2008/0102817 A1 | 5/2008 | Shenassa et al. | |
| 2008/0250408 A1* | 10/2008 | Tsui | H02J 7/0055 718/100 |
| 2008/0280612 A1 | 11/2008 | Bornier et al. | |
| 2009/0016456 A1 | 1/2009 | Li et al. | |
| 2009/0017829 A1 | 1/2009 | Laroia et al. | |
| 2009/0094317 A1 | 4/2009 | Vankitaraman | |
| 2009/0157829 A1 | 6/2009 | Choi et al. | |
| 2009/0177772 A1 | 7/2009 | Guan | |
| 2011/0113094 A1 | 5/2011 | Chunilal | |
| 2011/0142016 A1* | 6/2011 | Chatterjee | G06Q 30/02 370/338 |
| 2011/0243553 A1 | 10/2011 | Russell | |
| 2012/0051330 A1* | 3/2012 | Monnes | H04W 4/10 370/335 |
| 2012/0052802 A1 | 3/2012 | Kasslin et al. | |
| 2012/0158966 A1 | 6/2012 | Eberlein et al. | |
| 2012/0189040 A1* | 7/2012 | Ramachandran | H03D 3/00 375/219 |
| 2012/0189140 A1* | 7/2012 | Hughes | H04M 3/56 381/123 |
| 2012/0307821 A1 | 12/2012 | Kwon et al. | |
| 2013/0065627 A1 | 3/2013 | Jung et al. | |
| 2013/0196615 A1* | 8/2013 | Zalmanovitch | H04L 43/045 455/405 |
| 2013/0204938 A1 | 8/2013 | Son | |
| 2013/0337771 A1 | 12/2013 | Klein et al. | |
| 2013/0344863 A1 | 12/2013 | Nenner et al. | |
| 2014/0068212 A1* | 3/2014 | Lin | H04M 15/58 711/162 |
| 2014/0149507 A1* | 5/2014 | Redfern | H04L 65/00 709/204 |
| 2014/0179266 A1* | 6/2014 | Schultz | H04W 4/24 455/406 |
| 2014/0219146 A1 | 8/2014 | Mucke | |
| 2014/0254549 A1 | 9/2014 | Lee et al. | |
| 2014/0357218 A1 | 12/2014 | Andrianov et al. | |
| 2015/0046653 A1 | 2/2015 | Soundararajan et al. | |
| 2015/0128219 A1* | 5/2015 | Guday | H04L 63/08 726/4 |
| 2015/0180653 A1 | 6/2015 | Nix | |
| 2015/0296520 A1 | 10/2015 | Batchu et al. | |
| 2015/0327295 A1 | 11/2015 | Yang et al. | |
| 2015/0341837 A1* | 11/2015 | Zhao | H04W 48/18 455/436 |
| 2016/0014830 A1 | 1/2016 | Dunne et al. | |
| 2016/0014832 A1 | 1/2016 | Dunne et al. | |
| 2016/0044740 A1 | 2/2016 | Siomina et al. | |
| 2016/0088632 A1 | 3/2016 | Dunne et al. | |
| 2016/0092054 A1* | 3/2016 | Tomono | G06F 3/1454 715/738 |
| 2016/0156710 A1 | 6/2016 | Dunne et al. | |
| 2016/0192344 A1 | 6/2016 | Tiger | |
| 2016/0323871 A1 | 11/2016 | Dunne et al. | |
| 2017/0181075 A1 | 6/2017 | Takeda | |
| 2018/0199329 A1 | 7/2018 | Dunne et al. | |

OTHER PUBLICATIONS

"Dynamic Bandwidth Allocation," [online] Wikipedia, the Free Encyclopedia, Jan. 24, 2013 [retrieved Jul. 10, 2014] retrieved from the Internet: <http://en.wikipedia.org/wiki/Dynamic_bandwidth_allocation>, 1 pg.

"Distributed Hash Table," [online] Wikipedia, the Free Encyclopedia, May 23, 2014 [retrieved Jul. 10, 2014] retrieved from the Internet: <http://en.wikipedia.org/wiki/Distributed_hash_table>, 8 pg.

* cited by examiner

Receive, by a first mobile device, from each of a plurality of other mobile devices, information related to the availability of at least one network resource provided by at least a first network offered for sharing by the respective other mobile device
405

Receive, by the first mobile device, a request from a second mobile device to access the network resource provided by the first network shared by at least one of the plurality of other mobile devices
410

Select, by the first mobile device, using a processor, at least one of the other mobile devices to share the network resource provided by the first network with the second mobile device
415

Communicate, from the first mobile device to the second mobile device, peer-to-peer network connection information of the selected at least one of the other mobile devices, wherein the peer-to-peer network connection information is configured to be processed by the second mobile device to establish a peer-to-peer communication link between the second mobile device and each of the selected at least one of the other mobile devices via a second network and access the network resource of the first network shared by the selected at least one of the other mobile devices via the peer-to-peer communication link
420

FIG. 4

PEER-TO-PEER SHARING OF NETWORK RESOURCES

BACKGROUND

The present invention relates to communication networks, and more specifically, to use of network resources.

Users typically access the Internet via communication networks connected to the Internet. Access to such networks oftentimes is provided as a paid-for service (e.g., home broadband, cellular services, leased lines, etc.). The amount of network bandwidth provided by communication networks to individual users usually is limited. For example, a user may have a billing arrangement with a network provider in which a user pays a particular monthly fee in exchange a particular amount of network bandwidth. Moreover, some network providers, for example mobile network providers, limit the amount of network usage for a particular fee arrangement. In illustration, a network provider may allow a certain level of data that a user may send or receive over the communication network for a base fee. If the user exceeds that amount of network usage, additional fees may be charged to the user's account.

SUMMARY

A first mobile device includes a processor programmed to initiate executable operations. The executable operations can include activating on the first mobile device a role of sharing broker that brokers sharing of network resources of at least a first network among a plurality of other mobile devices. The executable operations also can include monitoring data usage by the first mobile device on at least the first network. The executable operations also can include, responsive to the data usage by the first mobile device on at least the first network exceeding a threshold value, adjusting an amount of data usage on at least the first network being shared by the first mobile device among the plurality of other mobile devices.

A computer program product includes a computer readable storage medium having program code stored thereon. The program code executable by a processor to perform a method. The method can include activating on the first mobile device a role of sharing broker that brokers sharing of network resources of at least a first network among a plurality of other mobile devices. The method also can include monitoring data usage by the first mobile device on at least the first network. The method also can include, responsive to the data usage by the first mobile device on at least the first network exceeding a threshold value, adjusting an amount of data usage on at least the first network being shared by the first mobile device among the plurality of other mobile devices.

In another aspect, a computer program product includes a computer readable storage medium having program code stored thereon. The program code executable by a processor to perform a method. The method can include determining, by a first mobile device, a second mobile device losing connectivity to a second network or a communication link between the second mobile device and the second network degrading below a threshold value, the second mobile device assigned a role of sharing broker that brokers sharing of network resources of at least a first network among a plurality of other mobile devices via the second network, the first mobile device and the plurality of other mobile devices participating in a sharing group. The method also can include, responsive to determining the second mobile device losing connectivity to the second network or the communication link between the second mobile device and the second network degrading below the threshold value, activating on the first mobile device the role of sharing broker that brokers the sharing of the network resources of at least the first network among the plurality of other mobile devices via the second network. The method also can include, responsive to activating on the first mobile device the role of sharing broker that brokers the sharing of the network resources of at least the first network among the plurality of other mobile devices via the second network, automatically communicating an indicator to the plurality of other mobile devices, the indicator indicating that the first mobile device has assumed to role of sharing broker.

DETAILED DESCRIPTION

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to communication networks, and more specifically, to use of network resources. In accordance with the inventive arrangements disclosed herein, users of mobile devices can choose to share network resources provided by their mobile service provider(s) with other mobile devices. From among the mobile devices, a particular mobile device can be chosen to be a sharing broker. Each mobile device can provide to the sharing broker information related to the availability of network resources being offered by the mobile device for sharing with other mobile devices. Such information can include, for example, data pertaining to an amount of bandwidth available for sharing, an amount of data usage available for sharing, security reliability, signal strength, user activity, signal strength, etc. The sharing broker can rank the various mobile devices based on such information.

When a particular mobile device has a need to use shared network resources, for example to increase total mobile network bandwidth available to the mobile device or to reduce data usage on a mobile account, the mobile device can communicate to the broker a request to use the shared network resources. The sharing broker can process the request and select one or more other mobile devices that are candidates to share network resources with the requesting mobile device. Further, the sharing broker can communicate to the requesting mobile device connection information for the selected mobile device(s).

The requesting mobile device can process the connection information to establish a peer-to-peer communication link, for example an ad-hoc peer-to-peer communication link, with the selected mobile device(s) and access the network resources shared by those mobile devices. In illustration, the shared network resource can be mobile network bandwidth provided by one or more mobile service providers, and the peer-to-peer communication link(s) can be established via one or more other networks (e.g., personal area networks, local area networks, and the like). Accordingly, surplus bandwidth/data usage can be shared amongst various mobile devices participating in a sharing group. Moreover, such sharing of network resources can be implemented seamlessly and securely with little or no user interaction beyond joining a sharing group and/or selecting a particular mobile device to act as a sharing broker. By leveraging shared network resources as described herein, each participating user can experience an enhanced level of network service beyond the users' base level of service. Moreover, users can share data usage to avoid exceeding data usage thresholds assigned to their individual mobile devices.

Several definitions that apply throughout this document now will be presented.

As defined herein, the term "mobile device" means a mobile communication device including at least one processor. Examples of a mobile device include, but are not limited to, a mobile computer, a laptop computer, a netbook computer, a tablet computer, a smart phone, a personal digital assistant (PDA), and the like. In the context of the arrangements described herein, routers and switches are not mobile devices. For example, a router or switch installed in a moving vehicle is not a mobile device in the context of the arrangements described herein.

As defined herein, the term "share" means for a first mobile device to allow use of, by a second mobile device, a mobile network resource provided to the first mobile device by a mobile network.

As defined herein, the term "network" means a communication network. Examples of a network include, but are not limited to, a personal area network (PAN), a local area network (LAN), a wireless LAN, a campus area network (CAN), a wide area network (WAN), a metropolitan area network (MAN), a mobile network (i.e., a cellular communication network), and the like. A network may include connections, such as wire, wireless communication links, or fiber optic cables. A router, switch and/or access point typically is provided as a connection point to the network by devices, such as mobile devices, accessing the network. Examples of communication protocols used by mobile devices to communicate via a mobile network include, but are not limited to, IEEE 802.11 (e.g., Wi-Fi), IEEE 812.116 (WiMax), 3G, 4G, LTE, GSM, EDGE, GPRS, IrDA, Bluetooth®, Zigbee®, wireless USB, Z-Wave, and the like.

As defined herein, the term "personal area network" means a network via which peer-to-peer communication links are directly established between devices without use of a router, switch or access point. In this regard, a personal area network is used by devices, such as mobile devices, to communicate among themselves. Communication protocols commonly used for communication between devices in a personal area network include, but are not limited to, IrDA, Bluetooth®, Zigbee®, wireless USB and Z-Wave.

As defined herein, a mobile network is a wireless network distributed over a plurality of land areas called cells, each cell being served by at least one base transceiver station (BTS) or cellular repeater, and each BTS or cellular repeater communicating with mobile devices on a different set of frequencies than the sets of frequencies used by BTSs or cellular repeaters of neighboring cells to communicate with mobile devices. A mobile network commonly is referred to as a cellular network. In the context of the arrangements described herein, routers, switches and LAN/WAN access points are not BTSs or cellular repeaters.

As defined herein, the term "network resource" means a network resource provided by a network to a mobile device.

As defined herein, the term "network bandwidth" means communication bandwidth provided by a network to a mobile device. Network bandwidth is an example of a network resource.

As defined herein, the term "network provider" is a company or organization that manages a network, such as a mobile network.

As defined herein, the term "ad-hoc peer-to-peer communication link" means a communication link established between at least two devices (e.g., mobile devices) for a specific purpose, for example for the purpose of sharing or accessing shared network resources provided by another network.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
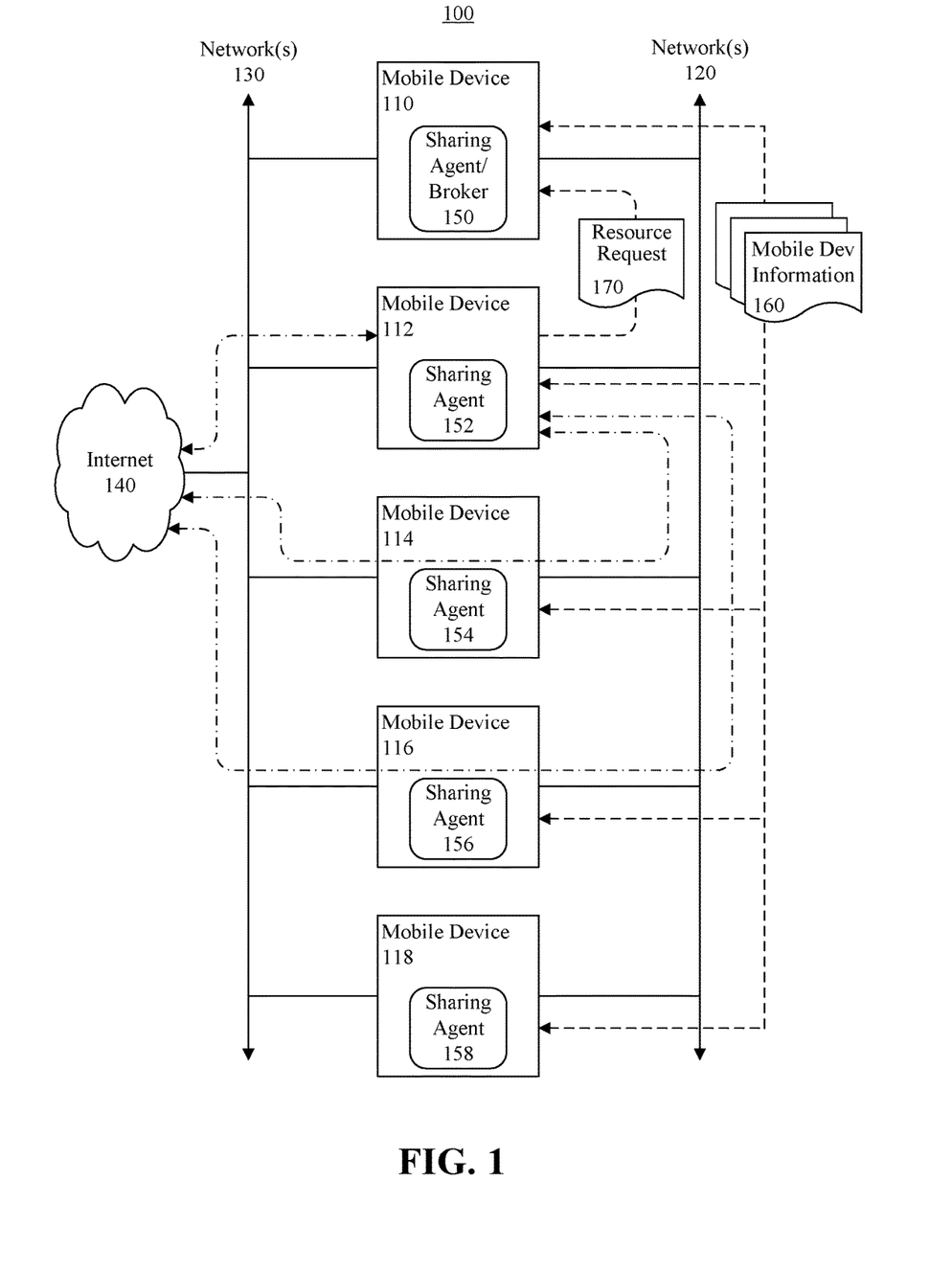
FIG. 1 is a block diagram illustrating an example of a computing environment.

FIG. 1 is a block diagram illustrating an example of a computing environment (hereinafter "environment") 100. The environment 100 includes a plurality of mobile devices 110, 112, 114, 116, 118 configured to communicate via one or more networks 120 (e.g., PANs, LANs, wireless LANs, WANs, CANs and/or MANs). The mobile devices 110-118 also are configured to communicate via one or more other networks 130, for example to access the Internet 140. The networks 130 can be, for example, mobile networks. In this regard, each of the mobile devices 110-118 can use the same network 130, or one or more of the mobile devices 110-118 may use a first network 130 (e.g., a first mobile network), one or more of the mobile devices 110-118 may use another network 130 (e.g., a second mobile network), etc.

Each of the mobile devices 110-118 can include a respective sharing agent 150, 152, 154, 156, 158. Each sharing agent 150-158 can be implemented as an application, service, plug-in or the like installed on a respective mobile device 110-118. Each sharing agent 150-158 can be configured to share network resources provided to the respective mobile device 110-118 by the network(s) 130 with other mobile devices 110-118. Further, one or more of the sharing agents 150-158, for example the sharing agent 150, also can be configured to function as a sharing broker that allocates shared network resources to mobile devices 110-118 which request use of such network resources.

In illustration, users of the mobile devices 110-118 can agree to share network resources provided to their respective mobile devices 110-118 by their network(s) 130. Each of the users can be members of a group of users whose mobile devices 110-118 have access to the Network(s) 120. In one aspect, each of the mobile devices 110-118 can be located within proximity of one another so that PAN communication links (e.g., Bluetooth®, Zigbee®, wireless USB and/or Z-Wave communication links) can be established among the mobile devices 110-118.

In one arrangement, the users of the respective mobile devices 110-118 can reach an agreement to share their network resources with one another. For example, one of the users can create a sharing group via the sharing agent 158 and send invitations, for instance as electronic messages, to the other users to join the group. The invitations can be sent from the forming user's sharing agent 158 to the sharing agents 150-156, the invitations can be sent via e-mail, the invitations can be sent via text messaging, or the like. The invitations can be sent via the Network(s) 120 and/or the network(s) 130. In another aspect, the forming user can verbally invite the other users to join the sharing group, and provide the sharing group name or other parameters the users may use to join the sharing group. Regardless of how users are invited to join the sharing group, the invitations and/or provided parameters can be processed by the sharing agents 150-156 on the respective mobile devices 110-116 to join the sharing group formed by the user of the mobile device 118, or a sharing group formed by any other user of the mobile devices 110-116. At this point it should be noted that any of the mobile devices 110-118 can participate in one or more sharing groups. Indeed, the presently described sharing group can be a sub-group of a larger sharing group.

The users of the mobile devices 110-118 can elect a particular user whose mobile device 110 is to function as a sharing broker. For example, the users can elect the user of the mobile device 110, in which case brokering functionality in the sharing agent 150 can be activated. In another arrangement, the mobile device 118 of the user who formed the sharing group can be elected as the broker, in which case brokering functionality in the sharing agent 158 can be activated. Nonetheless, the mobile device 110-118 which is to function as the broker can be selected in any other suitable manner and the present arrangements are not limited in this regard.

Moreover, the mobile device 110-118 to which broker functionality is assigned can be changed from time to time. For example, when a mobile device 118 functioning as the broker loses connectivity to the Network(s) 120 (e.g., the mobile device 118 leaves an area serviced by the Network(s) 120 or the mobile device 118 is turned off) or the communication link(s) between the mobile device 118 and the Network(s) 120 degrade(s) below a threshold level, another mobile device 110-116 can be selected to function as the broker. In one arrangement, users of the remaining mobile devices 110-116 can be prompted to vote on whose device is to take over as broker, or the mobile device 110 can be automatically selected from a list of mobile devices 110-118 participating in the sharing group.

For instance, each of the mobile devices 110-118 can be listed in some order, for example based on the order in which the mobile devices 110-118 joined the sharing group, based on average time of presence on the Network(s) 120, or based on any other parameter. When the mobile device 118 currently functioning as the sharing broker no longer is present on the network 120 or experiences degraded connectivity, a next mobile device 110 contained in the list can be automatically selected. In this regard, each sharing agent 150-158 can maintain a copy of the list, or access the list via the network 120 or network 130 (e.g., from a server), and automatically select the next sharing broker from the list. For example, the list can be maintained in a distributed hash table, which is known in the art, or another suitable data structure. In one aspect, the sharing agent 150 of the mobile device 110 that determines that it is to take over as the sharing broker can automatically communicate an indicator to the other mobile devices 112-116 indicating that it has assumed the role as sharing broker. When the mobile device 118 rejoins the Network(s) 120, the sharing agent 158 can poll one or more of the sharing agents 150-156, or a shared list, to determine which mobile device 110-116 presently is the sharing broker.

In another arrangement, rather than having a single sharing agent 150-158 that functions as a sharing broker, the broker function can be distributed among two or more of the sharing agents 150-158. Indeed, each sharing agent 150-158 can function as a sharing broker to share network resources with other mobile devices 110-118. In illustration, a distributed hash table can be used to store information 160, which will be described herein, related to each of the mobile devices 110-118, the networking resources they are offering to be shared, and networking resources that are needed. The distributed hash table can be accessed each time a sharing agent 150-158 is updating the information 160 and each time a sharing agent 150-158 is accessing shared network resources. In lieu of a distributed hash table, another shared data structure can be used to store and share the information 160.

For the following examples, unless otherwise indicated, it will be assumed that the mobile device 110 presently is selected to be the sharing broker and brokering functionality of the sharing agent 150 has been activated. The sharing agents 152-158 of each of the mobile devices 112-118 present on the Network(s) 120 can communicate to the sharing agent 150 information 160 pertaining to their respective mobile devices 112-118, including peer-to-peer connection information and information pertaining to network resources being shared. The sharing agent 150 also can collect such information 160 for the mobile device 110. Each sharing agent 150-158 also can communicate the information 160 to other sharing agents 152-158, and periodically update such information sent to the other sharing agents 152-158. Thus, each of the sharing agents 150-158 can receive and store the information 160 for other mobile devices 110-118.

In an arrangement in which the mobile devices 112-118 have a peer-to-peer communication links established among themselves via the Network(s) 120, the information 160 can be communicated via the Network(s) 120, thus avoiding use of the network(s) 130 to communicate the information 160, which may increase the level of data used by the mobile devices 110-118 on the network(s) 130. In another arrangement, for example if the mobile devices 110-118 do not have peer-to-peer communication links established among themselves via the Network(s) 120, the information 160 can be communicated via the network(s) 130.

The information 160 can include information related to the availability of one or more network resources, provided by the network(s) 130, offered for sharing by the respective mobile devices 110-118. For example, if the network 130 that services the mobile device 114 provides 10 Mb/S of bandwidth, the mobile device 114 can share a portion of that bandwidth to send and receive data packets on behalf of one or more other mobile devices 110, 112, 116, 118. The mobile device 114 also can share a certain portion of the available data usage. For example, if the network 130 provides to the mobile device 114 ten (10) GB of data usage per month, the mobile device 114 can share a portion of that data usage to send and receive data packets on behalf of one or more other mobile devices 110, 112, 116, 118. In one non-limiting arrangement, users of the mobile devices 110-118 can specify the bandwidth/data usage being shared, for example as percentages of available bandwidth/data usage or as fixed values. If the bandwidth/data usage is not specified by a user, a default level can be provided by the respective sharing agent 150-158.

In one aspect, the respective sharing agents 150-158 can monitor the data usage on their respective mobile devices 110-118, and make adjustments to the amount of data usage being shared. For example, if the data plan for the mobile device 112 provides ten (10) GB of data usage per month before additional charges are incurred, the sharing agent 152 can monitor the amount of time left in the current billing cycle, the amount of data that has been used in the current billing cycle, and the projected data usage for the remainder of the billing cycle based on current and/or average data usage. The amount of data usage being offered for sharing can be based, at least in part, on the projected data usage for the remainder of the billing cycle. For example, if the mobile device 112 has only used three (3) GB of data and only one week remains in the billing cycle, seven (7) GB of data usage can be offered for sharing. If, however, the mobile device 112 has used nine (9) GB of data and one week remains in the billing cycle, the sharing agent 152 can cease, or refrain from, offering data usage for sharing. Moreover, the information 160 can indicate deficits, or anticipated deficits, of bandwidth or data usage. For example, if the mobile device 112 is close to using its allotted data use before the end of the billing cycle, the information 160 can indicate such as a deficit, or anticipated deficit, of data usage.

The information 160 further can include information related to the configuration of the respective mobile devices 110-118, such as connection information that may be used to establish peer-to-peer communication links with the respective mobile devices 110-118 via the Network(s) 120 to access shared network resources. In one arrangement, the communication links can be ad-hoc peer-to-peer communication links. The information 160 also can include information related to the security protocols being implemented by the respective mobile devices 110-118 to communicate via the networks 120. For example, the information 160 provided by a particular mobile device 110-118 can include a public key to be used for encrypting data communicated to the mobile device 110-118, which the particular mobile device 110-118 may decrypt using its private key. In another aspect, the sharing agent 150 that is acting as the sharing broker can generate public/private keys, and distribute to each sharing agent 152-158 its respective private key. The sharing agent 150 further can store the corresponding public keys.

The information 160 further can include information related to security protocols implemented for communications between the mobile devices 110-118 and the network (s) 130 (e.g., the reliability of the security being implemented), the signal strength between the respective mobile devices 112-118 and the network(s) 130, user activity on the respective mobile devices 112-118, etc. Still, the information 160 can include any other information that may be relevant to make determinations as to whether, and when, network resources being shared by the respective mobile devices 112-118 should be shared with other mobile devices 110-118.

The sharing agent 150 can receive the information 160 provided by each of the sharing agents 152-158 and monitor the information 160 of the mobile device 110. Moreover, the information 160 can be updated from time to time, for example periodically. In illustration, the mobile devices 112-118 can communicate the information 160 at certain intervals, for example pre-defined intervals, or the sharing agent 150 can periodically poll the sharing agents 152-158 for the information 160. The sharing agent 150 also can periodically update the information 160 pertaining to the mobile device 110.

Based on the information provided by the sharing agents 152-158 and the information of the mobile device 110, the sharing agent 150 can monitor, for each mobile device 110-118, the level of network resources being shared, such as an amount of bandwidth/data rate being shared, the security level of the respective mobile network connections, the reliability of the security being implemented, the signal strength, user activity, as well as any other pertinent information. The sharing agent 150 can store corresponding data in a hash table, database table or the like, and update the data when new information 160 is received/detected.

Further, the sharing agent 150 can, based on the information 160 provided and the information 160 for the mobile device 110, determine a level of participation by each mobile device 110-118 in sharing network resources. Based on the determined level, the sharing agent 150 can assign sharing points to the respective mobile devices 110-118. Mobile devices 110-118 that share higher levels of bandwidth/data usage can be assigned a greater number of sharing points than mobile devices 110-118 that share lower levels of bandwidth/data usage. The number of the sharing points assigned can be proportional to the levels of bandwidth/data usage that are offered for sharing, proportional to the levels of bandwidth/data usage that are actually used by other mobile devices 110-118, or can be based on both. In one aspect, the number of sharing points assigned need not be proportional. For example, the number of sharing points assigned per unit of bandwidth/data usage can increase as the number of units of shared bandwidth/data usage increase. In illustration, a mobile device 116 sharing 2 GB of data usage can be assigned more than double the number of sharing points assigned to a mobile device 114 sharing 1 GB of data usage. Further, sharing points assigned to any particular mobile device 110-118 can be based, at least in part, on a level of security provided for the network resources being shared. For example, if the network 130 whose network resources are shared by the mobile device 114 are more secure than network resources shared by the mobile device 116, the mobile device 114 can be assigned a higher number of sharing points than the mobile device 116 for sharing an equivalent amount of bandwidth/data usage. Moreover, each time a mobile device 110-118 uses network resources shared by other mobile devices 110-118, the number of sharing points assigned to the mobile device 110-118 can be decreased accordingly.

Table 1 depicts an example of at least a portion of the shared information 160 for various mobile device 110-118 and corresponding sharing points that may be maintained by the sharing agent 150.

TABLE 1

|  | Shared Bandwidth (Mb/S) | Shared Data Usage (GB) | Security Level | Sharing Points |
|---|---|---|---|---|
| Mobile Device 110 | 10 | 5 | 2 | 876 |
| Mobile Device 112 | −1 | 2 | 3 | 1087 |
| Mobile Device 114 | 3 | 4 | 7 | 323 |
| Mobile Device 116 | 2.5 | −1 | 8 | 696 |
| Mobile Device 118 | 7 | 0 | 10 | 101 |

In the example, Table 1 can include, for each mobile device 110-118, information indicating the amount of network bandwidth being shared, the security level associated with use of such network bandwidth, and the sharing points accumulated by the particular mobile device 110-118. The mobile devices 110-118 can be ranked according to any of the parameters indicated in Table 1, or can be ranked based on any other parameters that are monitored. For example, the mobile devices 110-118 can be ranked based on the amount of shared bandwidth, the amount of shared data usage and/or the security level.

In Table 1, mobile devices 110, 114-118 indicate a positive number for the amount of bandwidth being shared, indicating that they presently are offering to share at least a portion of their network bandwidth. Mobile Device 112 indicates a negative amount of bandwidth being shared, indicating that the mobile device 112 is requesting to use bandwidth being offered for sharing by at least one other mobile device 110, 114-118. The mobile device 112, however, indicates a positive value of shared data usage. Accordingly, when the mobile device 112 no longer requires additional bandwidth, for example after the mobile device 112 has completed downloading a large file, the data usage of the mobile device 112 can be shared with other mobile devices 110, 114-118. In Table 1, the mobile device 116 indicates a negative amount of data usage being shared, indicating that the mobile device 116 does not have additional data usage that may be shared, but instead that the mobile device 116 requires shared data use of other mobile devices 110-114, 118. In this regard, the sharing agent 150 can update Table 1 when resource requests 170 are received from mobile devices 110-118. Table 1 also can be updated as mobile device information 160 is received from the various mobile devices 110-118.

As noted, a mobile device 110-118 assigned to be the sharing broker, for example the mobile device 110, may lose connectivity to the Network(s) 120. Nonetheless, it generally is desired that data relating to the sharing points of other mobile devices 112-118 not become inaccessible by other mobile devices 112-118 when this occurs. Accordingly, the sharing points can be stored by one or more of the other sharing agents 152-158. For example, each sharing agent 152-158 can track and store sharing points associated with its respective mobile device 112-118. When a new sharing broker is selected, the sharing agents 152-158 can communicate their respective sharing points to the sharing agent 152-158 tasked with implementing the broker functionality. Appropriate security measures can be implemented to prevent users from changing their assigned sharing points. In another arrangement, the sharing points can be stored in a distributed hash table, or the like, and accessed/updated as appropriate.

In one non-limiting arrangement, financial or other compensation can be provided to users of mobile devices 110-118 accumulating high levels of sharing points. For example, users who participate in the sharing group can be charged a fee for their participation. At least some of the proceeds from the fees collected can be distributed to those users who accumulate high levels of sharing points. In another aspect, users can trade in sharing points they have earned in exchange for financial or other compensation, and users can purchase additional sharing points as needed. Such transactions can be handled within the sharing group or by an outside entity, for example an entity providing the sharing agents 150-158. In such an arrangement, the sharing agents 150-158 can periodically communicate the sharing information to that entity.

When a particular mobile device 112 needs to use network resources shared by one or more other mobile devices 110, 114-118, the sharing agent 152 can communicate to the sharing agent 150 a request 170 to access such shared network resources, for example via the network 120. The request 170 can indicate an amount of shared bandwidth requested to be used by the mobile device 112, an amount of shared data usage requested to be used by the mobile device 112, a minimum security level requested for data communication, and the like. Responsive to receiving the request 170, the sharing agent 150 can process the request 170 to select one or more other mobile devices 110, 114-118 that are available to share the desired network resources with the mobile device 112.

Figure 2:
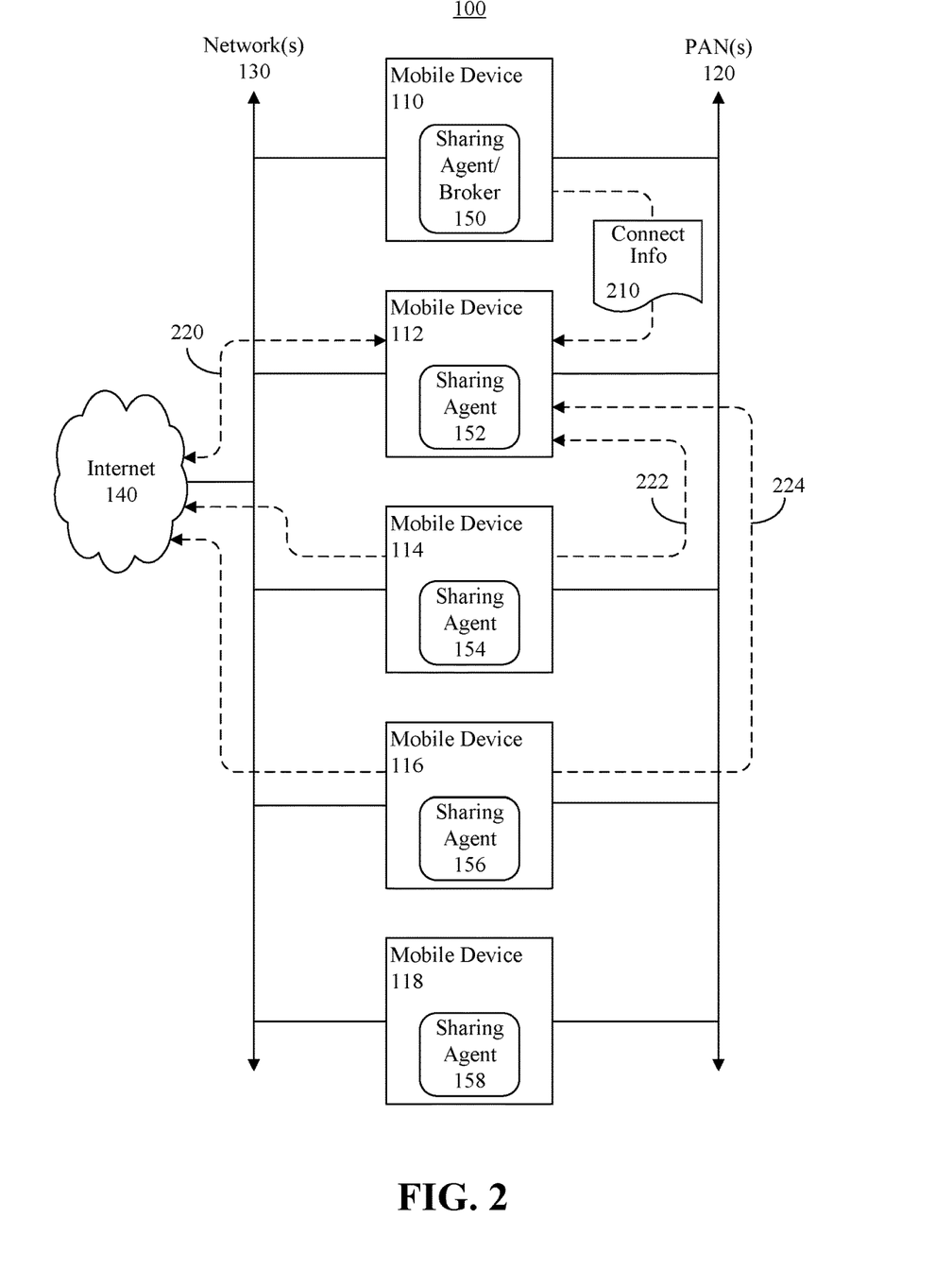
FIG. 2 is another block diagram illustrating the example computing environment of FIG. 1.

Referring to FIGS. 1 and 2, the sharing agent 150 can communicate to the sharing agent 152 connection information 210 for the selected mobile devices 110, 114-118. The connection information 210 can include network addresses for the selected mobile devices 110, 114-118 (e.g., IP addresses, MAC addresses, or other network addresses) that may be used to establish peer-to-peer communication links with the mobile devices 110, 114-118. The information also can include, for each of the selected mobile devices 110, 114-118, a public key to be used for communications sent to the respective mobile devices 110, 114-118. The mobile device 112 can process the connection information 210 to establish peer-to-peer communication links with the selected mobile devices 110, 114-118 via the Network(s) 120. The connection information 210 also can include information indicating the amount of shared network resources being allocated for use by the mobile device 112, corresponding security levels, etc.

The connection information 210 can be communicated via the network(s) 130 or via the network 120. In an arrangement in which a communication link already is established between the mobile device 112 and the selected mobile devices 110, 114-118 via the network 120, the mobile device 112 may already have the network addresses of the other mobile devices 110, 114-118. Hence, in such case, the connection information 210 need not include network addresses of the mobile devices 110, 114-118.

In one arrangement, the sharing agent 150 can allocate to the mobile device 112 certain portions of the network resources being shared by the mobile devices 110, 114-118. For example, the sharing agent 150 can consider requests 170 for network resources received from other mobile devices 110, 114-118, consider resource deficits of the mobile device 112 and the other mobile devices 110, 114-118, consider sharing points earned by the respective mobile devices 110-118, consider the level of network resources shared by the mobile devices 110, 114-118 previously used by the mobile device 112, consider sharing service subscription levels, consider security levels, consider security reliability, consider geographic proximity of respective mobile devices 110-118 to one another, consider proximity of respective users to one another in a social network, and the like. In illustration, the sharing agent 150 can evaluate the sharing points assigned to the mobile device 112, sharing points assigned to other mobile devices 110, 114-118 requesting use of shared network resources, and the variety of network resources being offered for sharing.

The level of sharing points assigned to the mobile devices 110-118 can be processed by the sharing agent 150 to determine a priority to assign to mobile devices 110-118 requesting use of network resources shared by other mobile devices 110-118. For example, if both the mobile device 114 and mobile device 118 are requesting access to shared network resources, and the mobile device 114 has more assigned sharing points than the mobile device 118, the sharing agent 150 can give higher priority to the mobile device 114. In illustration, if the total bandwidth being requested by the mobile devices 114, 118 exceeds the total shared bandwidth being offered by the mobile devices 110, 112, 116, the sharing agent 150 can allocate the available shared bandwidth proportionally to the mobile devices 114, 118 based on the sharing points assigned to the respective mobile devices 114, 118. Accordingly, those mobile devices 110-118 that are more active in sharing network resources or have greater network resources to share can be given greater priority when accessing shared network resources than mobile devices 110-118 that are not as active at sharing network resources or that do not have as great of network resources to share. Accordingly, users are provided incentive to actively share their respective network resources.

As noted, other sharing information 160 can be stored in the distributed hash table, or the like. In such an arrangement, the connection information 210 can be retrieved from the distributed hash table, or the like. When a particular sharing agent 150-158 needs to use mobile networking resources shared by other mobile devices 110-118, the sharing agent 150-158 can access the distributed hash table, or the like, to determine from which other mobile devices 110-118 mobile networking resources may be accessed. In this particular arrangement, it may not be necessary to designate a particular mobile device 110-118 to be a sharing broker. Instead, each sharing agent 150-158 can implement its own brokering functionality to share network resources and access network resources shared by other mobile devices 110-118.

Regardless of how the connection information 210 is obtained by the sharing agent 152, the sharing agent 152 can process the connection information 210 to establish, in real time, an peer-to-peer communication link with each of the mobile devices 110, 114-118 whose shared network resources are allocated for use by the mobile device 112. As noted, the peer-to-peer communication link(s) can be established via the Network(s) 120. In another arrangement, the peer-to-peer communication link(s) can be established via another suitable network, such as a LAN, wireless LAN, WAN, CAN, MAN or the like.

Once the peer-to-peer communication link(s) is/are established, the mobile device 112 can use the allocated shared network resources, thus enhancing the user's experience accessing the Internet 140. In illustration, the mobile device 112 can communicate a first portion 220 of data over the Internet 140 via a communication link established between the mobile device 112 and the network 130. The mobile device 112 also can communicate a second portion 222 of the data over the Internet 140 via the mobile device 114 and communicate a third portion 224 of the data via the mobile device 116.

When the mobile devices 114, 116 communicate data via the Internet 140 on behalf of the mobile device 112 using their communication links to the network(s) 130, the respective sharing agents 154, 156 can process data packets sent and received on behalf of the mobile device 112 to associate such data packets with the mobile device 112. For example, when sending data packets on behalf of the mobile device 112, the sharing agents 154, 156 can insert into the data packets identification information associating those data packets with the mobile device 112. The identification information can be, for example, received from the mobile device 112 and inserted into header fields of the data packets. When data packets are received via the Internet 140 on behalf of the mobile device 112, the sharing agents 154, 156 can parse from the packet headers identification information associated with the mobile device 112, and forward those data packets to the mobile device 112 via the Network(s) 120 (or other suitable network(s)). Further, the communication of data between the mobile device 112 and the mobile devices 114, 116 can be encrypted, for example using the public/private keys previously described.

Should the networking resources being shared with the mobile device 112 by the mobile device 114 and/or mobile device 116 become unavailable while those resources are being shared, a failover procedure can be implemented in real time so as not to significantly disrupt the flow of data between the mobile device 112 and the Internet 140. For example, if the mobile device 116 loses connection to the network 130, the mobile device 116 can communicate to the sharing agents 150, 152 a corresponding message. In another example, the mobile device 116 may lose connection to the network 120. In either scenario, the sharing agent 152 can cease using the shared network resources provided by the mobile device 116. Further, the sharing agent 150 can select another mobile device, for example the mobile device 118, to share network resources with the mobile device 112. The sharing agent 150 can communicate corresponding connection information 210 to the sharing agent 152 as previously described.

Figure 3:
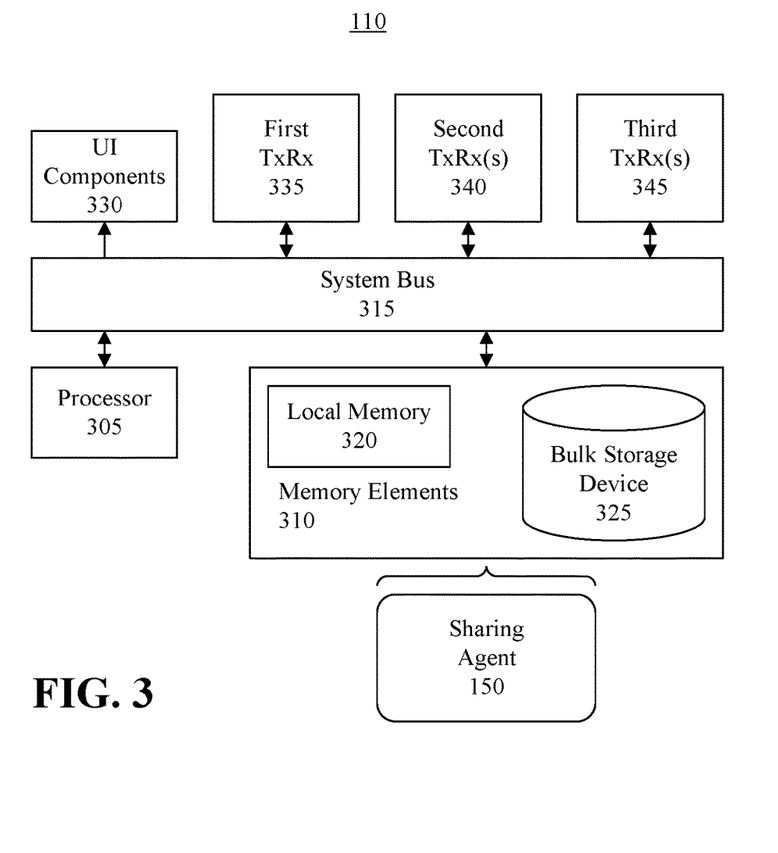
FIG. 3 is a block diagram illustrating example architecture for a mobile device.

FIG. 3 is a block diagram illustrating example architecture for a mobile device 110 of FIGS. 1 and 2. The example architecture also is representative of the mobile devices 112-118 of FIGS. 1 and 2.

The mobile device 110 can include at least one processor 305 (e.g., a central processing unit) coupled to memory elements 310 through a system bus 315 or other suitable circuitry. As such, the mobile device 110 can store program code within the memory elements 310. The processor 305 can execute the program code accessed from the memory elements 310 via the system bus 315. The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The mobile device 110 also can include one or more cache memories (not shown) that provide temporary storage of at least some program code in order to reduce the number of times program code must be retrieved from the bulk storage device 325 during execution.

Input/output (I/O) devices such as user interface (UI) components 330 (e.g., a display, pointing device, etc.) can be coupled to the mobile device 110. The I/O devices can be coupled to the mobile device 110 either directly or through intervening I/O controllers. The mobile device also can include a plurality of transceivers 335, 340, 345 that enable mobile device 110 to become coupled to other mobile devices, systems, computer systems, remote printers, and/or remote storage devices through intervening private or public networks. For example, the first transceiver 335 can be configured to communicatively link the mobile device 110 to a mobile network, for example to access the Internet, support voice communications, support electronic messaging, and the like. The second transceiver 340 can be configured to communicatively link the mobile device 110 to one or more LANs, WANs, CANs, MANs, or the like. The third transceiver 345 can be configured to communicatively link the mobile device 110 to one or more other mobile devices via one or more PANs.

As pictured in FIG. 3, the memory elements 310 can store the sharing agent 150 of FIGS. 1 and 2. Being implemented in the form of executable program code, the sharing agent 150 can be executed by the mobile device 110 and, as such, can be considered part of the mobile device 110. Moreover, the sharing agent 150 and data structures used by the sharing agent 150 to store, retrieve and process data are functional data structures that impart functionality when employed as part of the mobile device 110.

Figure 4:
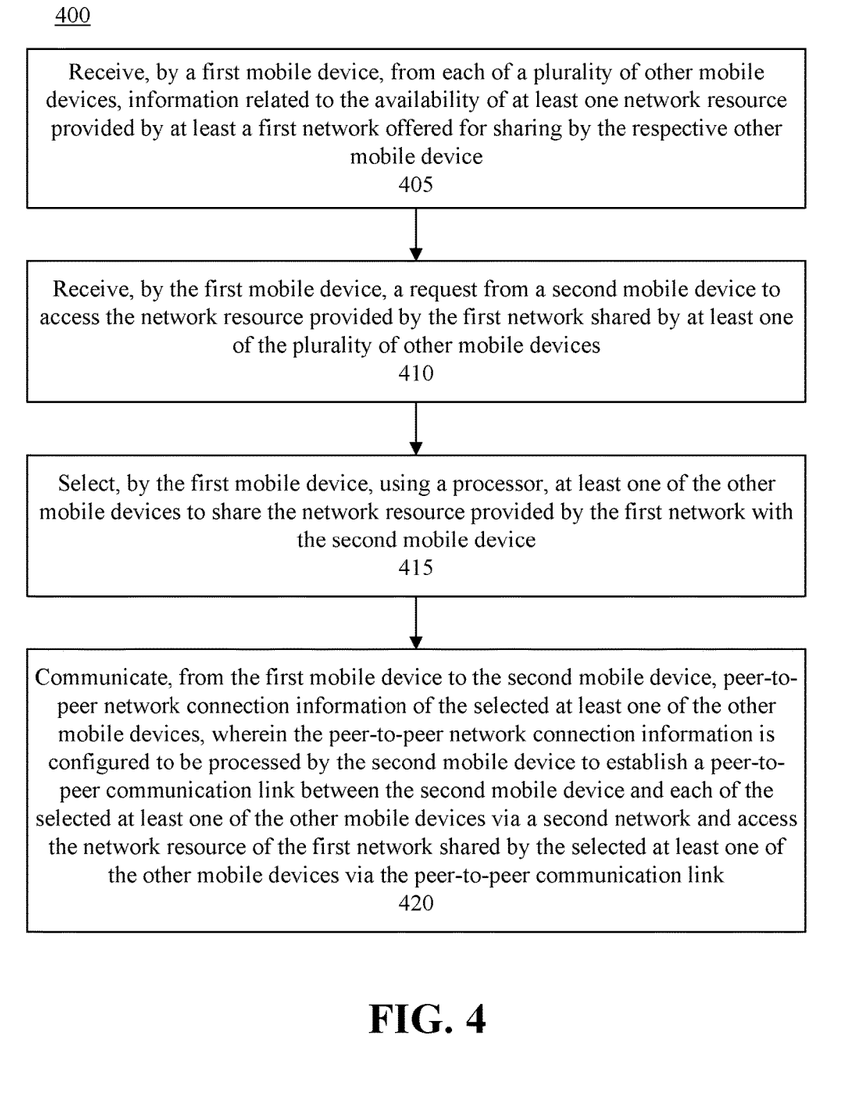
FIG. 4 is a flow chart illustrating an example of a method of sharing network resources.

FIG. 4 is a flow chart illustrating an example of a method 400 of sharing network resources. At step 405, a first mobile device can receive, from each of a plurality of other mobile devices, information related to the availability of at least one network resource provided by at least a first network offered for sharing by the respective other mobile device. At step 410, the first mobile device can receive a request from a second mobile device to access the network resource provided by the first network shared by at least one of the plurality of other mobile devices. At step 415, the first mobile device can select, using a processor, at least one of the other mobile devices to share the network resource provided by the first network with the second mobile device. At step 420, the first mobile device can communicate to the second mobile device peer-to-peer network connection information of the selected at least one of the other mobile devices. The peer-to-peer network connection information is configured to be processed by the second mobile device to establish a peer-to-peer communication link between the second mobile device and each of the selected at least one of the other mobile devices via a second network and access the network resource of the first network shared by the selected at least one of the other mobile devices via the peer-to-peer communication link.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A first mobile device, comprising:
a processor programmed to initiate executable operations comprising:
activating on the first mobile device a role of sharing broker that brokers sharing of network resources of at least a first network among a plurality of other mobile devices;
monitoring data usage by the first mobile device on at least the first network; and
responsive to the data usage by the first mobile device on at least the first network exceeding a threshold value, adjusting an amount of data usage on at least the first network being shared by the first mobile device among the plurality of other mobile devices.

2. The first mobile device of claim 1, wherein the monitoring the data usage by the first mobile device on at least the first network comprises monitoring an amount of data that has been used by the first mobile device in a current billing cycle.

3. The first mobile device of claim 2, wherein the monitoring the data usage by the first mobile device on at least the first network further comprises monitoring an amount of time left in the current billing cycle and a projected data usage for a remainder of the billing cycle.

4. The first mobile device of claim 3, wherein the projected data usage is based on a current data usage by the first mobile device.

5. The first mobile device of claim 3, wherein the projected data usage is based on an average data usage by the first mobile device.

6. The first mobile device of claim 2, wherein the monitoring the data usage by the first mobile device on at least the first network further comprises determining a deficit, or an anticipated deficit, of data usage by the first mobile device for the current billing cycle.

7. The first mobile device of claim 1, wherein the activating on the first mobile device the role of sharing broker that brokers the sharing of the network resources of at least the first network among the plurality of other mobile devices is responsive to the first mobile device being selected from a list of the plurality of other mobile devices participating in the sharing group.

8. The first mobile device of claim 1, wherein the activating on the first mobile device the role of sharing broker that brokers the sharing of the network resources of at least the first network among the plurality of other mobile devices is responsive to the first mobile device being selected based on votes of users of the plurality of other mobile devices participating in the sharing group.

9. A computer program product comprising a computer readable storage medium having program code stored thereon, the program code executable by a processor to perform a method comprising:
   activating on a first mobile device a role of sharing broker that brokers sharing of network resources of at least a first network among a plurality of other mobile devices;
   monitoring data usage by the first mobile device on at least the first network; and
   responsive to the data usage by the first mobile device on at least the first network exceeding a threshold value, adjusting an amount of data usage on at least the first network being shared by the first mobile device among the plurality of other mobile devices.

10. The computer program product of claim 9, wherein the monitoring the data usage by the first mobile device on at least the first network comprises monitoring an amount of data that has been used by the first mobile device in a current billing cycle.

11. The computer program product of claim 10, wherein the monitoring the data usage by the first mobile device on at least the first network further comprises monitoring an amount of time left in the current billing cycle and a projected data usage for a remainder of the billing cycle.

12. The computer program product of claim 11, wherein the projected data usage is based on a current data usage by the first mobile device.

13. The computer program product of claim 11, wherein the projected data usage is based on an average data usage by the first mobile device.

14. The computer program product of claim 10, wherein the monitoring the data usage by the first mobile device on at least the first network further comprises determining a deficit, or an anticipated deficit, of data usage by the first mobile device for the current billing cycle.

15. The computer program product of claim 9, wherein the activating on the first mobile device the role of sharing broker that brokers the sharing of the network resources of at least the first network among the plurality of other mobile devices is responsive to the first mobile device being selected from a list of the plurality of other mobile devices participating in the sharing group.

16. The computer program product of claim 9, wherein the activating on the first mobile device the role of sharing broker that brokers the sharing of the network resources of at least the first network among the plurality of other mobile devices is responsive to the first mobile device being selected based on votes of users of the plurality of other mobile devices participating in the sharing group.

17. A computer program product comprising a computer readable storage medium having program code stored thereon, the program code executable by a processor to perform a method comprising:
   determining, by a first mobile device, a second mobile device losing connectivity to a second network or a communication link between the second mobile device and the second network degrading below a threshold value, the second mobile device assigned a role of sharing broker that brokers sharing of network resources of at least a first network among a plurality of other mobile devices via the second network, the first mobile device and the plurality of other mobile devices participating in a sharing group;
   responsive to determining the second mobile device losing connectivity to the second network or the communication link between the second mobile device and the second network degrading below the threshold value, activating on the first mobile device the role of sharing broker that brokers the sharing of the network resources of at least the first network among the plurality of other mobile devices via the second network; and
   responsive to activating on the first mobile device the role of sharing broker that brokers the sharing of the network resources of at least the first network among the plurality of other mobile devices via the second network, automatically communicating an indicator to the plurality of other mobile devices, the indicator indicating that the first mobile device has assumed to role of sharing broker.

18. The computer program product of claim 17, wherein activating on the first mobile device the role of sharing broker that brokers the sharing of the network resources of at least the first network among the plurality of other mobile devices via the second network further is responsive to the first mobile device being selected from a list of the plurality of other mobile devices participating in the sharing group.

19. The computer program product of claim 17, wherein the first mobile device and the plurality of other mobile devices participating in the sharing group establish peer-to-peer communication links among themselves via the second network and the network resources of the first network are shared over the peer-to-peer communication links.

20. The computer program product of claim 17, wherein the role of sharing broker is distributed among the first mobile device and at least one of the plurality of other mobile devices.

* * * * *